(No Model.)
N. A. POWELL.
PLOW.
No. 315,441. Patented Apr. 7, 1885.
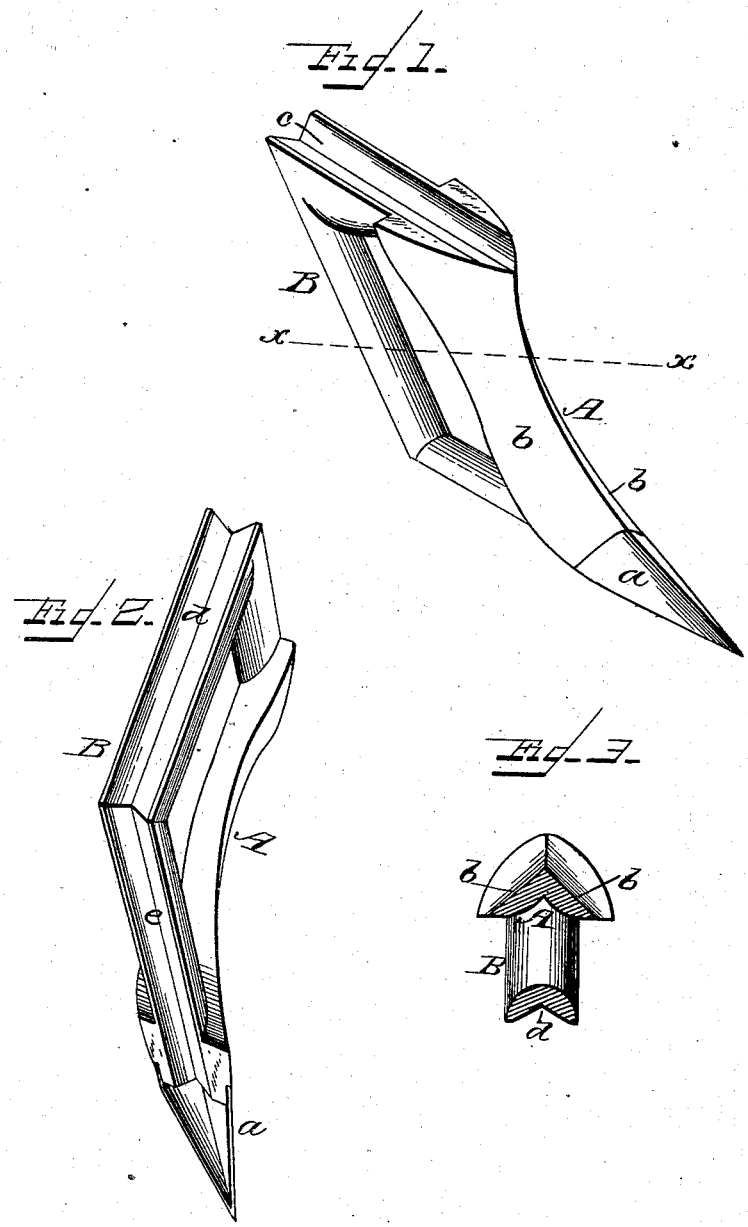
WITNESSES
F. L. Ourand
L. L. Miller
INVENTOR
Nelson A. Powell,
per Chas. H. Fowler
Attorney

United States Patent Office.

NELSON ALBRIGHT POWELL, OF LENOIR, NORTH CAROLINA.

PLOW.

SPECIFICATION forming part of Letters Patent No. 315,441, dated April 7, 1885.

Application filed November 14, 1884. (No model.)

*To all whom it may concern:*

Be it known that I, NELSON A. POWELL, a citizen of the United States, residing at Lenoir, in the county of Caldwell and State of North Carolina, have invented certain new and useful Improvements in Plows; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, an under side perspective view thereof; Fig. 3, a cross-section taken on line $x\,x$ of Fig. 1.

The present invention has relation to certain new and useful improvements in plows; and it consists in the details of construction, substantially as shown in the drawings, and hereinafter described and claimed.

In the accompanying drawings, A represents the front of the plow, to which the point $a$ is detachably connected by any suitable means found most convenient. The section A, which forms the front of the plow, has angular sides $b$, to cut and split the earth to be broken, also subsoiling and disintegrating the ground without simply turning it over, said section being curved inwardly, as shown, whereby its effectiveness is materially increased to accomplish the above-named results. The frame B is formed with a top groove, $c$, and rear groove, $d$, which not only decreases its weight and economy of material in its manufacture, but enables the wooden attachments to be held more securely and firmly in position with the aid of screws or rivets. A groove, $e$, is formed in the bottom of the frame B, to enable the plow to be more easily and effectively guided in ground that is stony or otherwise defective or difficult of management. This frame may be cast in one piece with the front curved portion of the plow, or made in sections and afterward connected together in any suitable manner.

Having now fully described my invention, what I claim as new, and desire to secure by Letters Patent, is—

A plow provided with a frame having grooves upon its upper, under, and rear sides, and a curved front section having angular sides and attached thereto a suitable point, substantially as and for the purpose set forth.

In testimony that I claim the above I have hereunto subscribed my name in the presence of two witnesses.

NELSON ALBRIGHT POWELL.

Witnesses:
R. R. WAKEFIELD,
S. M. CLARKE.